United States Patent [19]

Miller et al.

[11] 4,215,921
[45] Aug. 5, 1980

[54] INTERMITTENT PRIME FILM MOVER USING MULTI-TOOTHED WHEEL DRIVE

[75] Inventors: Adron M. Miller, Burbank; Harvey J. Richardson, Sepulveda, both of Calif.

[73] Assignee: RCA Corporation, New York, N.Y.

[21] Appl. No.: 22,841

[22] Filed: Mar. 22, 1979

[51] Int. Cl.² .............................................. G03B 1/24
[52] U.S. Cl. .................................... 352/187; 352/180
[58] Field of Search ............... 352/166, 187, 188, 189, 352/180; 226/87

[56] References Cited

U.S. PATENT DOCUMENTS

| 1,299,469 | 4/1919 | Holmes | 226/87 |
|---|---|---|---|
| 1,490,279 | 4/1924 | Kucharski | 352/187 |
| 1,888,094 | 11/1932 | Ranieri | 352/187 |
| 3,565,521 | 2/1971 | Butler et al. | 352/187 |
| 3,606,526 | 9/1971 | Smith et al. | 352/166 |
| 3,819,258 | 6/1974 | Butler et al. | 352/187 |
| 3,912,383 | 10/1975 | Stutz | 352/166 |
| 4,022,525 | 5/1977 | Boudouris | 352/187 |
| 4,149,781 | 4/1979 | Everett | 352/187 |
| 4,150,886 | 4/1979 | Merkel et al. | 352/166 |

FOREIGN PATENT DOCUMENTS

| 2333021 | 1/1975 | Fed. Rep. of Germany | 352/187 |
|---|---|---|---|
| 2818910 | 9/1978 | Fed. Rep. of Germany | 352/187 |

*Primary Examiner*—Monroe H. Hayes
*Attorney, Agent, or Firm*—E. M. Whitacre; P. J. Rasmussen; J. M. O'Meara

[57] ABSTRACT

An improved intermittent drive for a motion picture film projector having a film gate, condenser lens, light source and shutter means is provided by a relatively large sprocket wheel having forty sprocket teeth with 12 to 14 teeth engaging the film at the sprocket holes. This sprocket wheel is driven by a servo motor capable of rapid start and stop and high-speed motion under electronic control. The sprocket wheel supports the film between the film gate aperture (light gate) and the condenser lens. The sprocket wheel is of sufficiently large diameter so as to provide a circumferential curvature that does not appreciably change the vertical plane of a single frame of film thereon.

4 Claims, 7 Drawing Figures

INTERMITTENT PRIME FILM MOVER USING MULTI-TOOTHED WHEEL DRIVE

BACKGROUND OF THE INVENTION

This invention relates to a motion picture film incremental drive for a motion picture projector and more specifically to motion picture projection of 16 mm (millimeter) film.

Historically, 16 mm film with sprocket holes has been pulled down intermittently by means of a claw or finger type reciprocating mechanism (Geneva type). With the advent of high-speed motors, which can be stopped and started very quickly and can be electronically controlled, a much faster and more efficient prime moving film system becomes feasible. The basic problem precluding the use of this type of system is the vulnerability of the sprocket holes in the film.

Normally, only two sprocket holes in 16 mm film are engaged by the film pull-down system. In a fast pull-down or high-speed system, torque is used to move the film. If only two holes are engaged, the uniformity of the sprocket holes in the film may be destroyed. The faster speed available from servo type motors magnifies the problem.

In addition there is the problem of centering the film frame in the gate aperture before illumination. Precise centering in 35 mm has been done by measuring optically the passage of sprocket holes. While for 35 mm there is 4 sprocket holes per frame, there is only one sprocket hole per frame in 16 mm. Also the start and stopping of a 35 mm projector using a servo motor is dependent upon a changing D.C. bias control by counting the sprocket holes. For a 16 mm projector using such a servo motor there is only one hole per frame to control the servo motor.

SUMMARY OF THE INVENTION

An improved intermittent film drive for a film projector is provided by electronically controlled high-speed servo motor capable of rapid start and stop motion. A pulser coupled to the motor causes the motor to start and stop at relatively high-speeds. A sprocket wheel coupled to the motor has a plurality of sprocket teeth engaging more than 4 sprocket holes of the film to thereby distribute the force on the sprocket holes. The sprocket wheel is positioned relative to the film gate and condenser lens of the projector such that the film engaged on the wheel passes between the lens and the aperture gate. The sprocket wheel is of sufficiently large diameter so as to provide a circumferential curvature to the film that does not appreciably change the vertical plane of a single frame of the film.

DESCRIPTION OF THE INVENTION

Figure 1:
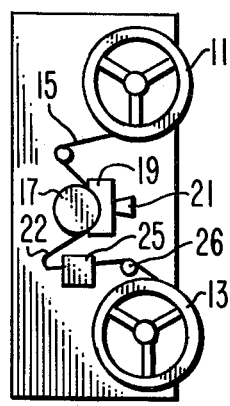
FIG. 1 is a sketch of the projector.

Referring to FIG. 1 there is illustrated a sketch of the motion picture projector 10. The projector includes a typical supply reel 11 and take-up reel 13. These reels are driven by a drive source (not shown). The film 15 is routed about a relatively large sprocket wheel 17 driven in intermittent fashion frame by frame by a low inertia D.C. servo motor. This D.C. motor can be quickly stopped and rapidly started and is electronically controlled as to be discussed further. The film 15 is driven by the sprocket wheel 17 between a condenser lens and a film gate unit 19. The film gate unit 19 is positioned very close to the film without touching the emulsion side of the film. The light gate aperture (film gate) is in the film gate unit 19 along the beam path. A projection lens 21 is coupled to the film gate unit 19. The film after leaving the large sprocket wheel 17 is formed in a loop 22 and applied to a constant drive sprocket audio detection unit 23 to smooth out the jerky motion of the sprocket wheel before being applied to the audio detector in unit 23. The film from the audio detector is then applied via a constant speed sprocket 25 to take-up reel 13.

Figure 3:
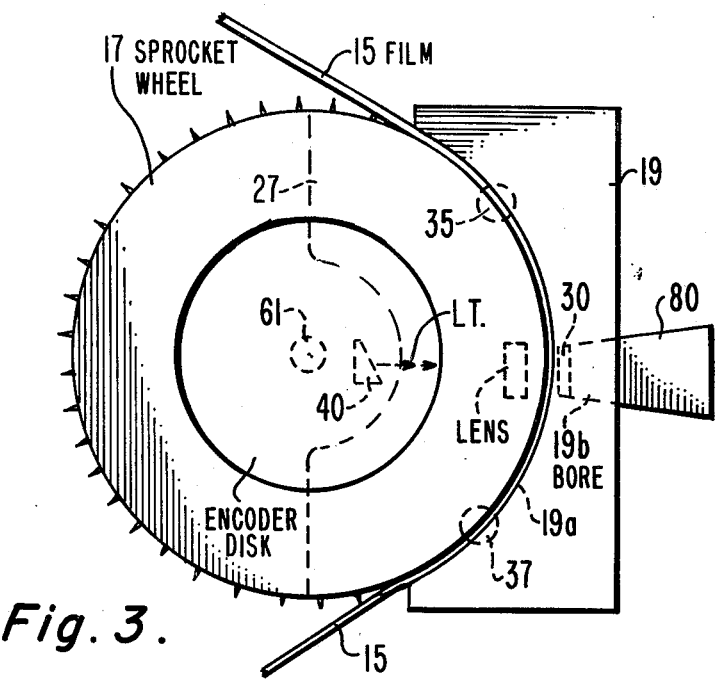
FIG. 3 is a side elevation view of the sprocket wheel assembly and the film gate.
Figure 2:
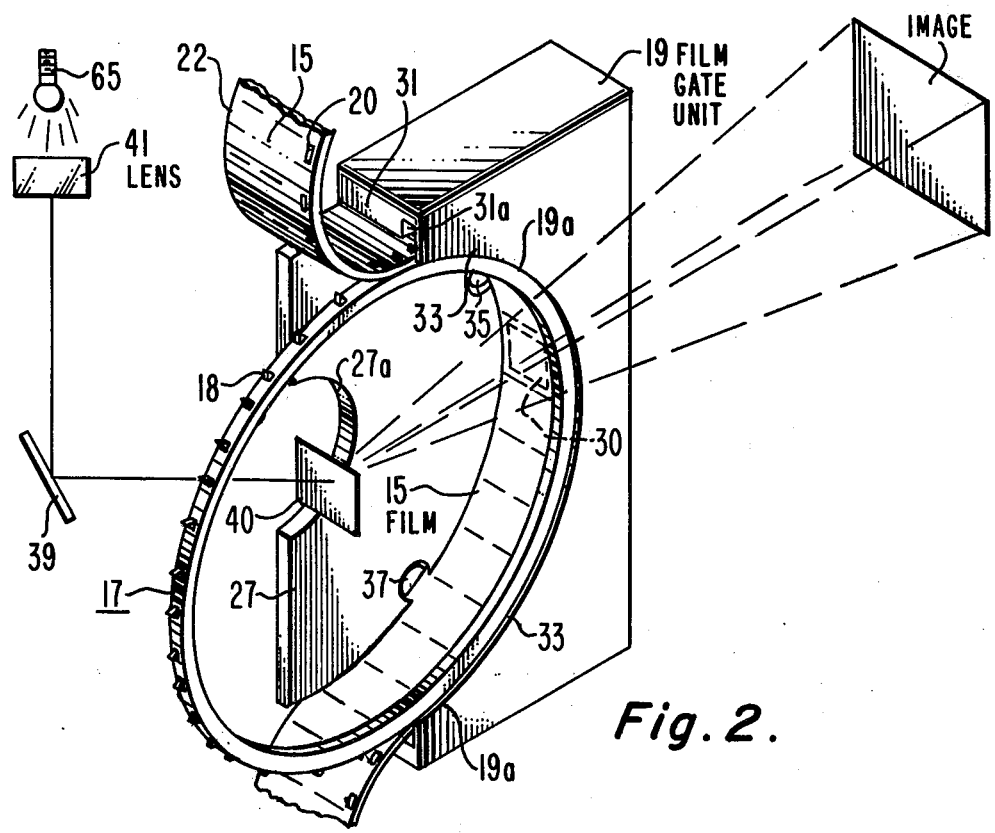
FIG. 2 is a perspective view of the sprocket wheel and film gate with portions of the wheel removed for illustration.
Figure 4:
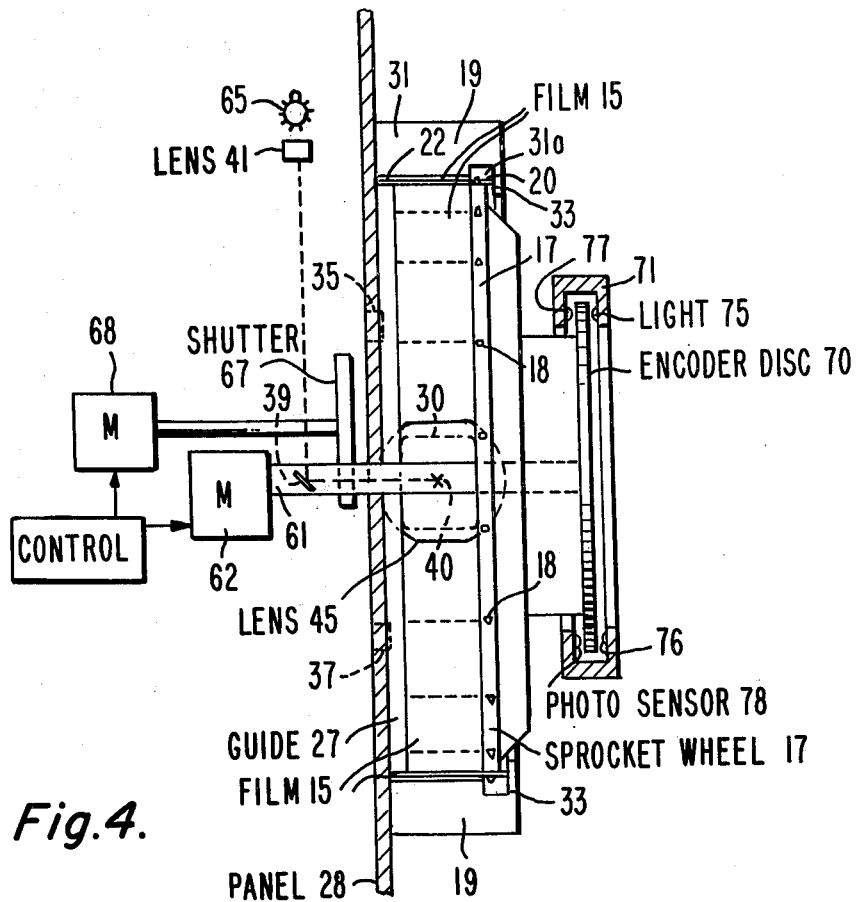
FIG. 4 is a sketch of the sprocket wheel and encoder disc assembly as viewed in a direction of the projection light through the lens.

Referring to FIGS. 2 through 4, there is illustrated in more detail the relatively large sprocket wheel 17 (outboard and broken away for illustration purposes in FIG. 2) and film guide assembly. The sprocket wheel 17 has 40 sprocket teeth 18 extending in radial fashion about the periphery of the wheel. These sprocket teeth 18 fit into 12 to 14 sprocket holes of the film near the outboard edge 20 of the film 15. The other edge 22 of the film rests along a semi-circular fixed guide 27. The semi-circular guide 27 extends from about the 12 o'clock position of the wheel to about the 6 o'clock position of the wheel. The semi-circular guide 27 is fixed to a side panel 28 of the projector (see FIG. 4). The semi-circular guide 27 has a peripheral surface aligned with that of the periphery of the sprocket wheel 17 directly opposite the contact region of the film. The film gate unit 19 has a small light gate aperture 30 therethrough (the film or light gate) to allow one frame of the picture to be shown. The light gate aperture (film gate) 30 is very close to the emulsion surface of the film to provide picture framing. The film gate unit 19 has a curved surface 19a on the light gate end 31 to conform to the sprocket wheel 17. This end 31 of the film gate unit 19 has a groove 31a therein aligned with the sprocket wheel 17 location so that the outboard ends of the sprocket teeth 18 extend therein. The film gate unit 19 also has an outboard lip or rim 33 that extends slightly over the outboard edge of the wheel (without touching). The outermost edge 20 of the film is urged against this outboard lip or rim 33 as a lateral guide by spring-loaded sapphire-hard ceramic pads 35 and 37 extending through the fixed semi-circular guide 27 from the side panel 28.

The projection light 65 is a quartz-halogen lamp source and this light is routed by a series of mirrors 39 and 40 and relay lens 41 (beam producing lens) toward the aperture gate 30. The light is beamed from the lens 41 down and then by mirror 39 toward the wheel and by a mirror 40 directed toward the light gate aperture 30. The semi-circular guide 27 has a portion removed near the center region to permit the light pass and the mechanical coupling of the motor to the sprocket wheel to pass (motor shaft). The condenser lens 45 is mounted close to the film 15 on the light source side (inside of the wheel) and is aligned with the aperture or light gate 30. The condenser lens 45 is mounted to the panel 28 via an aperture 27a in the semi-circular guide 27 near the film gate. The light from the aperture gate 30 is passed through a hollow bore portion 19b (illustrated in FIG. 3) in the gate unit 19 to the projection lens 80.

Referring to FIG. 4, the sprocket wheel 17 is driven by a shaft 61 coupled to the low inertia servo motor 62. The light from the source 65 is interrupted when moving the film by the shutter disc 67 driven by motor 68 which is synchronized with the motor 62 in that the shutter cuts off the light before each movement of film. The disc 67 would have a clear portion and an opaque portion, with the opaque portion interrupting the light between the mirror 39 behind the panel 28 and the mirror 41 behind the film. Also note that there is an aperture in the panel 28 to permit both the servo motor shaft 61 and the light to pass.

Figure 5:
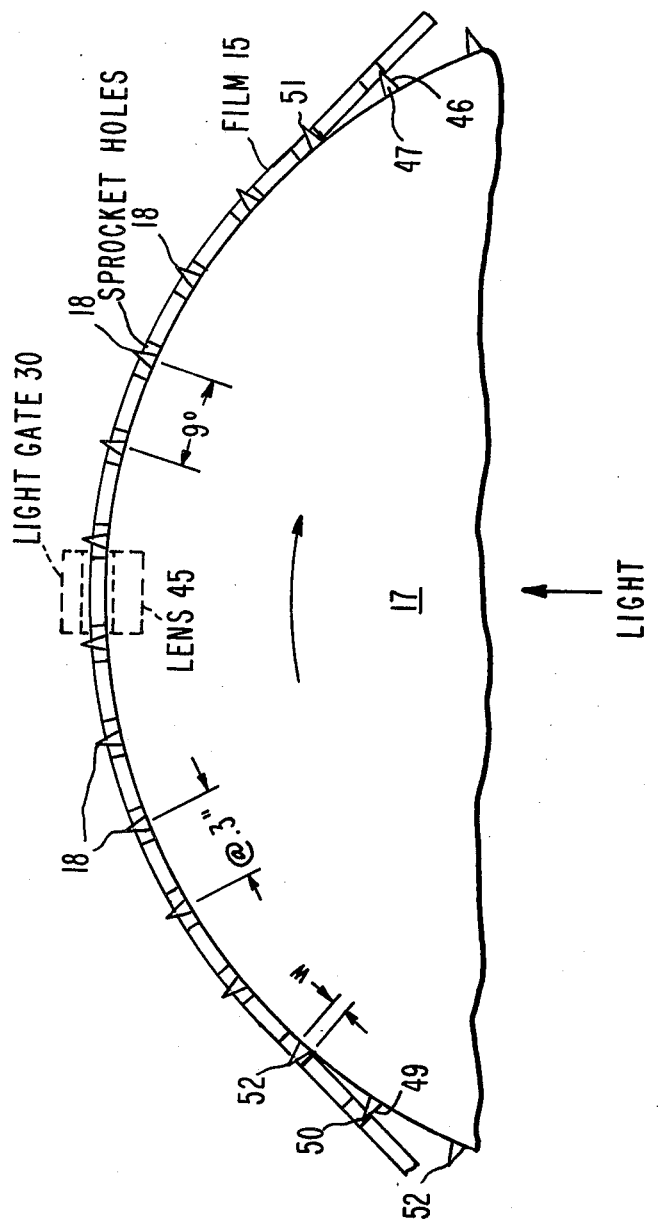
FIG. 5 is a magnified view of a portion of the sprocket wheel and film.

Referring to FIG. 5, there is illustrated the manner in which the film is captured by the sprocket wheel. The sprocket wheel and sprocket teeth are magnified for illustrative purposes and the film is magnified to even greater degree. The film 15 is captured by 12 to 14 sprocket teeth as illustrated. The sprocket teeth engage the film such that the film is securely captured between the leading edge 46 of the sprocket tooth 47 and the trailing edge 49 of the sprocket tooth 50. The first two sprocket teeth 47 and 51 and the last two sprocket teeth 50 and 52 lock the film tightly on the wheel to prevent slippage and twisting of the film. The sprocket teeth are arranged and the film is routed relative to the wheel such that as the sprocket tooth first engages the sprocket hole the trailing edge of the tooth is contacting the trailing edge of the hole as shown at sprocket 50 and as the film leaves the sprocket tooth the leading edge of the sprocket tooth contacts the leading edge of the sprocket hole as illustrated by sprocket 47. The sprocket teeth near the aperture gate 30 are centered relative to the hole. The 40 sprocket teeth are spaced about 9 degrees apart on a sprocket wheel 17. The spacing between the center of the sprocket holes is about 0.3 inch and the spacing between the sprocket teeth from the center of one sprocket tooth to the center of the next sprocket tooth is just slightly less than 0.3 inch (about 0.2995 inch). The width of each sprocket tooth at the base is about 0.035 inch wide. The sprocket wheel 17 has a diameter of about 3.8 inches. The sprockets are shaped to conform with the recommended sprocket design setforth in the SMPTE publication entitled, "SMPTE RECOMMENDED PRACTICE FOR 16 MM AND 18 MM SPROCKET DESIGN," publication No. RP1-1950 (reaffirmed—October, 1963).

Figure 6:
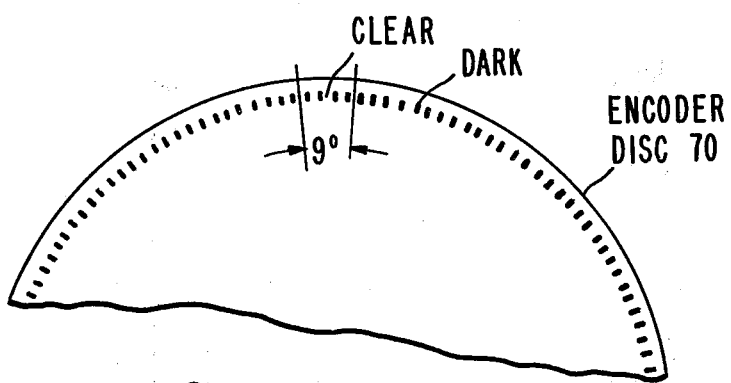
FIG. 6 illustrates a portion of the encoder disc.

Referring to FIG. 4, an encoder disc 70 is coupled to the servo motor shaft 61 for rotation with sprocket wheel 17. The disc 70, illustrated partly in FIG. 6, has 160 small clear and 160 opaque areas near the periphery thereof. These small clear and opaque areas are equally spaced with 4 dark areas and 4 clear areas every 9 degrees of arc of the encoded disc 70. A U-shaped collar 71 (shown in cross-section in FIG. 4) fits in space relation about the encoder disc 70. There are 3 light sources (light emitting diodes, sources 75 and 76 shown) mounted to the collar 71 which emit light toward the encoded disc 70. On the opposite side of the disc 70 on the collar 71 is mounted 3 photosensor devices (sensors 77 and 78 is shown) for detecting the passage of light through the disc 71 and hence the movement of the disc and sprocket wheel. The sensors detect the transitions from black or opaque and clear and therefore for 9 degrees of movement of the sprocket wheel 17 (one frame) there are 8 transitions of light and dark (leading and trailing of each dark or opaque area).

Figure 7:
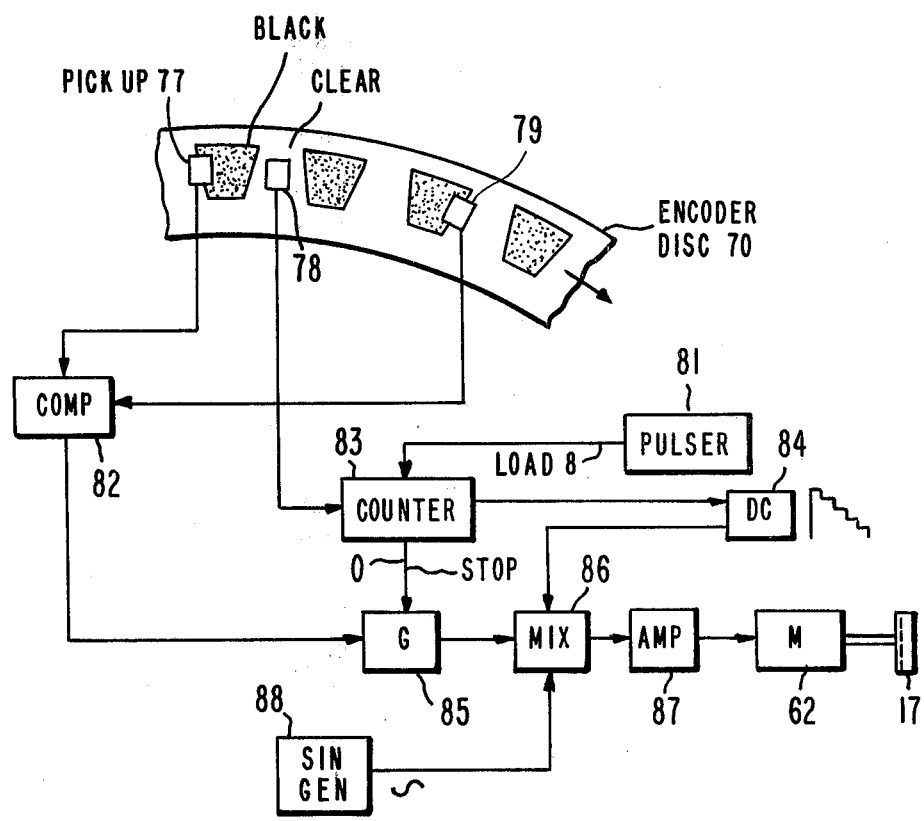
FIG. 7 is a diagram illustrating the system for controlling the servo motor.

Referring to FIG. 7, there is illustrated the system for controlling the sprocket wheel. Each time the sprocket wheel 17 is to be driven by the servo motor 62 an 8-bit load signal is provided by a pulser 81 to a count-down counter 83. A D.C. digital supply 84 in response to the load 8 count supplies maximum power to the servo motor 62 via a mixer 86 and servo motor drive amplifier 87 causing it to rapidly start up. One of the photosensors (sensor 78 for example) detects the transition from clear to black or opaque to clear and sends for each transition to a pulse to count-down counter 83. As the counter counts down, this count is supplied from the counter 83 to the D.C. digital supply 84 which causes the D.C. power via amplifier 87 to accordingly step down such that at 0 count the D.C. power is shut off and the motor is stopped. The other two photosensors 77 and 79 are used for fine registration of the film frame relative to the aperture gate. The fine registration photosensors 77 and 79 are located such that if the wheel is correctly positioned the two photosensors 77 and 79 pickup the same amount of light, with each photosensor sensing ½ of the maximum light level at the transition region of clear to opaque. The one photosensor 77 is positioned to detect the trailing edge of the opaque to light area and the other photosensor 79 is positioned to detect the leading edge of the dark area. At the point illustrated the film is centered with the aperture gate. If the wheel is moved too far forward there is no signal at sensor 79 and a total coupled signal at sensor 77. The opposite is true if the wheel has not been moved far enough. The two pickup signals are compared at comparator 82 and any error signal is gated by the zero count from counter 83 (indicative of the motor being stopped in the coarse mode) via a mixer 86 to servo drive amplifier 87. The drive amplifier 87 amplifies the signal sufficiently to drive the motor in the correcting sense. It has been found that there may be a slight sinusoidal error due to deriving the control signals from the encoder disc rather than from the film or sprocket wheel 17 directly. This causes a slight up and down movement in the picture. This can be corrected by generating a sinusoidal signal of opposite phase at generator 88 and applying this signal to the mixer 86 in the control path to cancel out this movement.

What is claimed is:

1. In a motion picture film projector of the type including a projection light, a condenser lens focusing light onto a film frame, a gate aperture, and a shutter means for interrupting the light to the film, an improved intermittent film drive for intermittently driving the film when the shutter cuts off the light to the film, comprising:

an electronically controlled high-speed servo motor capable of rapid start and stop motion, pulser means coupled to said motor for driving said motor in rapid start and stop motions during said light cut-off time periods, a sprocket wheel coupled to said motor, said sprocket wheel having a plurality of sprocket teeth extending radially therefrom to engage more than four sprocket holes in the film, said sprocket teeth being configured and spaced such that each sprocket hole contacts the trailing edge of the sprocket tooth when being engaged and contacts the leading edge of the sprocket tooth when being disengaged to thereby capture the film securely on said sprocket wheel between the leading edge of one sprocket tooth and trailing edge of another sprocket tooth, said sprocket wheel being positioned relative to said light gate aperture and condenser lens such that the film captured on said wheel passes between said lens and light gate aperture, and said wheel being of a sufficiently large diameter so that a single frame of film resides in substantially a vertical plane at said gate aperture, with the film drive force distributed over the length of tape captured on the wheel.

2. The combination of claim 1 wherein said sprocket wheel has 40 sprocket teeth with at least 12 sprocket teeth engaging the film.

3. The combination of claim 1 including means for detecting the rotated position of said sprocket wheel to provide control signals, means coupled to said motor and responsive to said control signals for centering the frame of the film with said light gate aperture and stopping said wheel.

4. The combination of claim 3 wherein said means for detecting including an encoder disc having a plurality of light and dark areas per 9 degrees of arc and a photosensor and light emitter devices on opposite sides of the disc, and means for coupling said disc to said sprocket wheel to rotate therewith.

* * * * *